(12) United States Patent
Kemppainen et al.

(10) Patent No.: US 6,786,247 B1
(45) Date of Patent: Sep. 7, 2004

(54) INFLATING DEVICE

(75) Inventors: Kurt Kemppainen, 2130 Highland Dr., Hollister, CA (US) 95023; Tom Moeller, 157 Irwin Dr. #, Stateline, NV (US) 89449

(73) Assignees: Kurt Kemppainen, Hollister, CA (US); Tom Moeller, Stateline, NV (US); John Albert Gunther, Belmont, CA (US); Patrick Chen, Taichung (TW)

( * ) Notice: Subject to any disclaimer, the term of this patent is extended or adjusted under 35 U.S.C. 154(b) by 0 days.

(21) Appl. No.: 10/435,123

(22) Filed: May 9, 2003

(30) Foreign Application Priority Data

Mar. 26, 2003 (TW) ...................................... 92204685 U

(51) Int. Cl.[7] .............................................. B65B 3/04
(52) U.S. Cl. ...................... 141/84; 141/382; 141/383; 137/223; 137/231; 137/233
(58) Field of Search .......................... 141/38, 84, 382, 141/383; 137/223, 231–234

(56) References Cited

U.S. PATENT DOCUMENTS 5,832,974 A * 11/1998 Jou .............................. 141/392
6,145,161 A * 11/2000 Jou .............................. 15/331
6,276,405 B1 * 8/2001 Wang .......................... 141/38

* cited by examiner

*Primary Examiner*—J. Casimer Jacyna
(74) *Attorney, Agent, or Firm*—Dellett & Walters

(57) ABSTRACT

An inflating device has a tubular body, a connector, an inflating needle, an end cap, a holder, an adapter and an airflow controlling device. The body has a central hole. The connector is formed on the body and has an inlet channel communicating with the central hole. The inflating needle is mounted on the body and has a first inflating channel communicating with the central hole. The end cap is attached to the body. The holder is received in the body and abuts against the end cap. The adapter is received in the body and has a second inflating channel. The airflow controlling device is mounted in the body to selectively communicate the inlet channel in the connector with one of the inflating channels. Accordingly, the inflating device can be adapted to inflate different types of objects and is versatile in use.

9 Claims, 8 Drawing Sheets

INFLATING DEVICE

BACKGROUND OF THE INVENTION

1. Field of the Invention

The present invention relates to an inflating device, and more particularly to an inflating device that can be adapted to inflate different types of objects such as a tire of a vehicle or a ball.

2. Description of Related Art

A ball or a tire of a vehicle must be inflated with air at a desired pressure to make the ball or the tire to achieve its purpose and function. To inflate a ball or a vehicle, an inflating device connected to a pneumatic supply must be used. To inflate different objects, different inflating devices are used. For example, an inflating needle with an inflating channel is used to inflate a ball, and an inflating connector that can engage with a tire valve on a tire is used for inflating the tire. The inflating needle for a ball has a structure essentially different that of the inflating connector for a tire. The conventional inflating device can only be adapted to inflate a single type of object and is not versatile in use.

To overcome the shortcomings, the present invention tends to provide an inflating device to mitigate or obviate the aforementioned problems.

SUMMARY OF THE INVENTION

The main objective of the invention is to provide an inflating device that can be adapted to inflate different types of object and is versatile in use. The inflating device has a tubular body, a connector, an inflating needle, an end cap, a holder, an adapter and an airflow controlling device. The body has a central hole defined through the body. The connector is formed on the body and is adapted to connect to a pneumatic supply. The connector has an inlet channel extending through the connector and communicating with the central hole in the body. The inflating needle is mounted on the body and has a first inflating channel defined through the inflating needle and communicating with the central hole in the body. The end cap is attached to the body and has an inserting hole defined through the end cap. The holder is received in the body and abuts against the end cap. The adapter is received in the central hole in the body and has a second inflating channel. The airflow controlling device is mounted in the body to selectively communicate the inlet channel in the connector with one of the first inflating channel in the inflating needle and the second inflating channel in the adapter.

Other objects, advantages and novel features of the invention will become more apparent from the following detailed description when taken in conjunction with the accompanying drawings.

DETAILED DESCRIPTION OF PREFERRED EMBODIMENT

Figure 1:
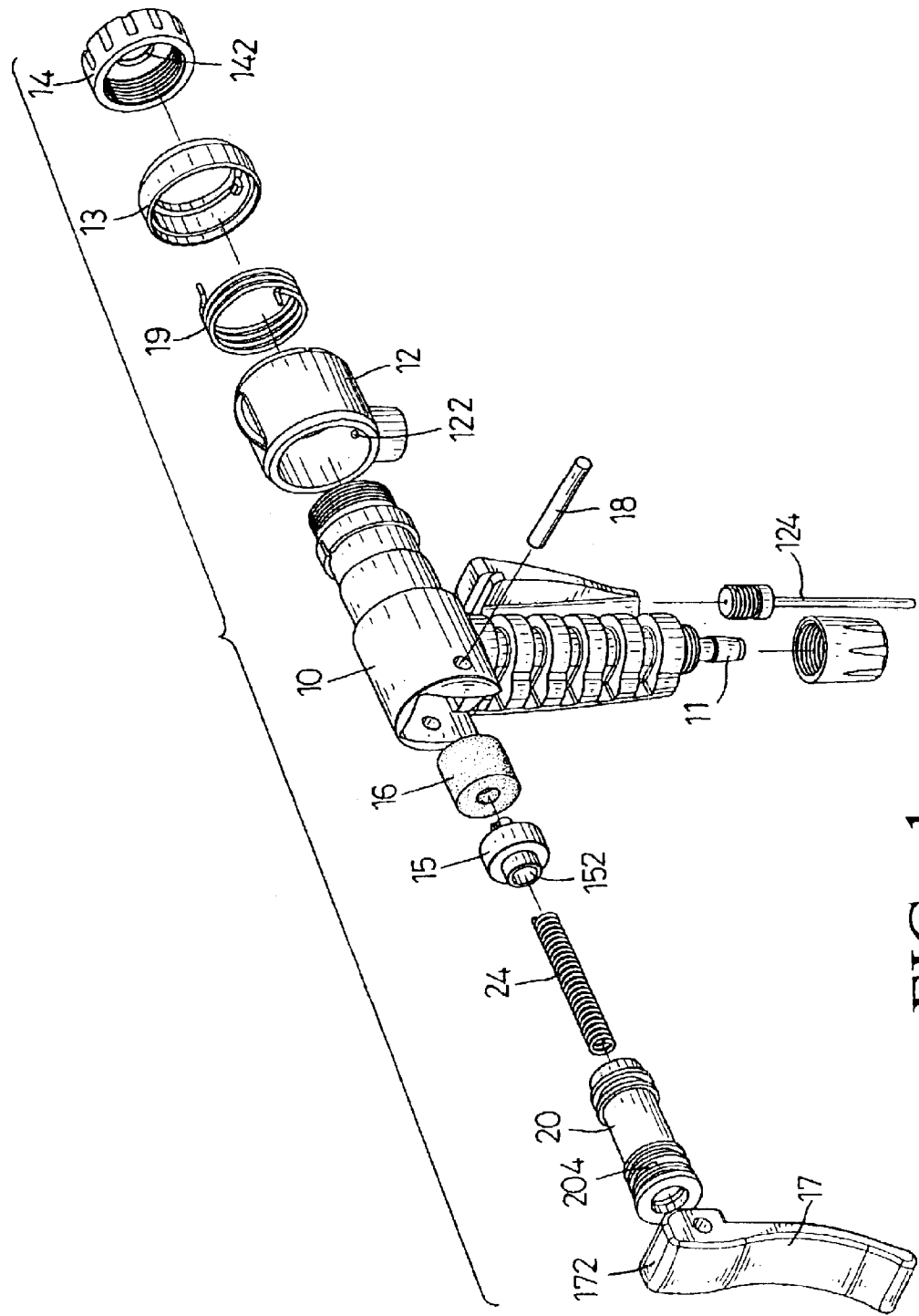
FIG. 1 is an exploded perspective view of a first embodiment of an inflating device in accordance with the present invention.
Figure 2:
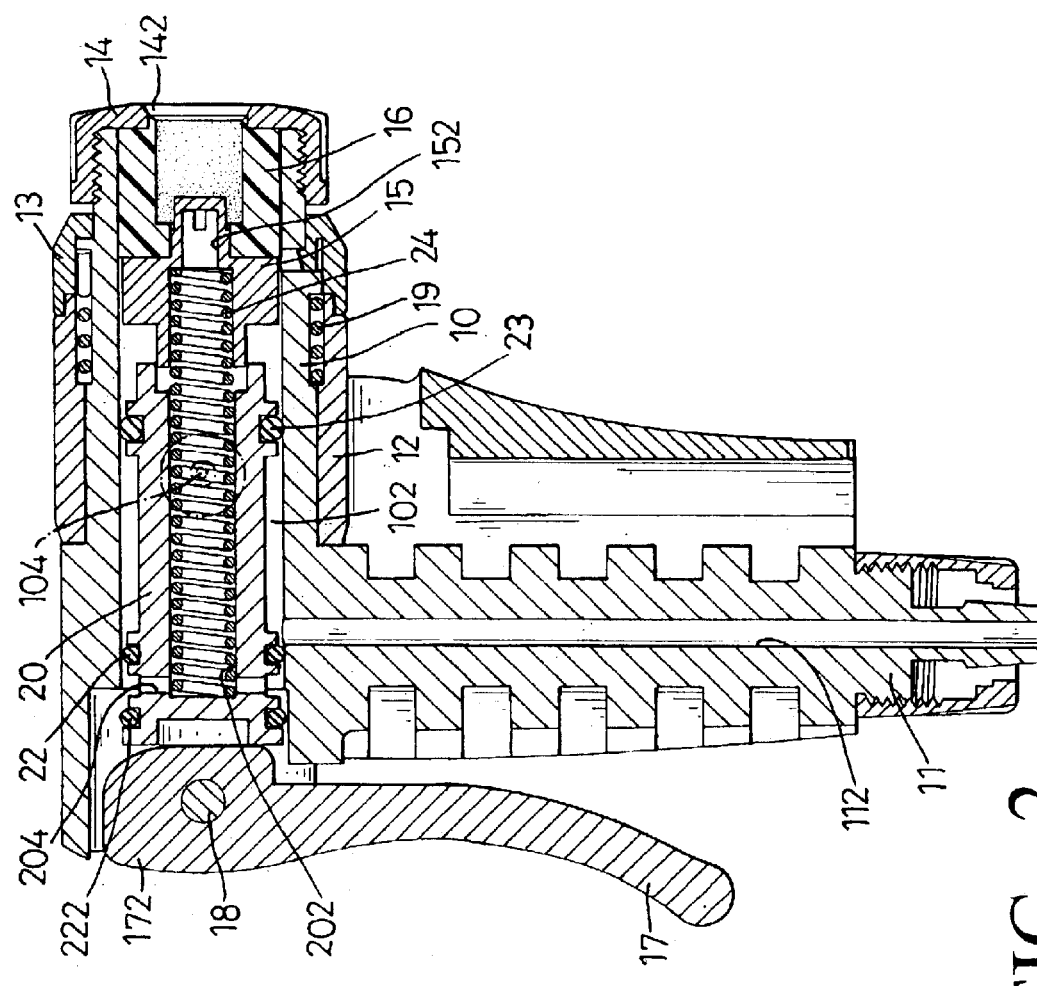
FIG. 2 is a cross sectional side plan view of the inflating device in FIG. 1.
Figure 3:
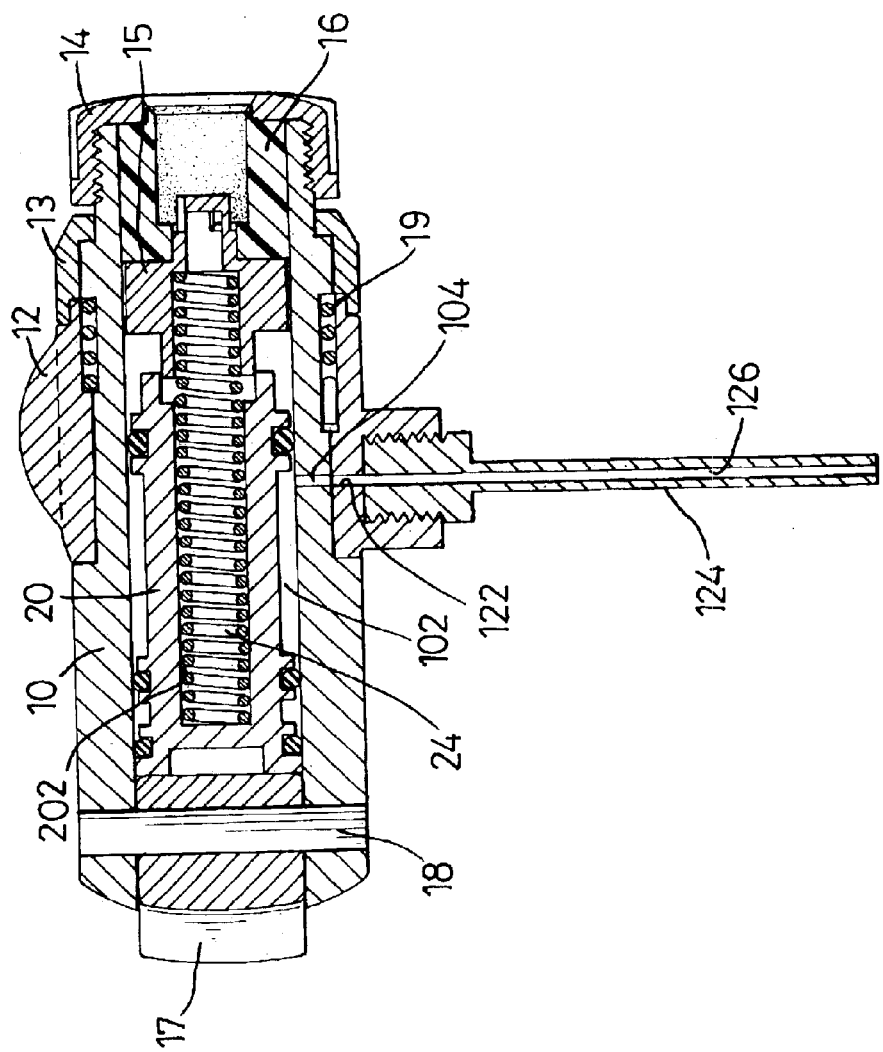
FIG. 3 is a side plan view in partial cross section of the inflating device in FIG. 1.

With reference to FIGS. 1, 2 and 3, an inflating device in accordance with the present invention comprises a body (10), a connector (11), an inflating needle (124), an end cap (14), a holder (16) an adapter (15) and an airflow controlling device. The body (10) is tubular and has a first end, a second end and a central hole defined through the tubular body (10). The connector (11) is formed on the body (10) near the second end and is adapted to connect to a pneumatic supply (not shown). An inlet channel (112) extends through the connector (11) and communicates with the central hole in the body (10).

The inflating needle (124) is mounted on the body (10). In practice, a needle holder (12) is rotatably mounted around the body (10), and the inflating needle (124) is attached to the needle holder (12). Accordingly, the inflating needle (124) is mounted on the body (10) through the needle holder (12). A first inflating channel (126) is defined through the inflating needle (124). An outlet (122) is defined in the needle holder (12) and communicates with the first inflating channel (126) in the inflating needle (124). An exhausting hole (104) is defined in the body (10) and communicates with the outlet (122) in the needle holder (12) when the needle holder (12) is rotated to a position where the outlet (122) aligns with the exhausting hole (104). Therefore, the first inflating channel (126) communicates with the central hole in the body (10) through the outlet (122) in the needle holder (12) and the exhausting hole (104) in the body (10).

A holding cap (13) is mounted around the body (10) near the first end of the body (10). A torsion spring (19) is mounted around the body (10) between the needle holder (12) and the holding cap (13) and has two ends securely attached to the needle holder (12) and the holding cap (13) respectively. With the torsion force provided by the torsion spring (19), the outlet (122) in the needle holder (12) can be kept away from the exhausting hole (104) in the body (10).

The end cap (14) is attached to the first end of the body (10) and has an inserting hole (142) defined through the end cap (14). The holder (16) is annular and is made of a resilient material. The holder (16) is received in the first end of the body (10) and abuts against the end cap (14). A central hole (not numbered) is defined through the holder (16) and communicates with the inserting hole (142) in the end cap (14).

The adapter (15) is received in the central hole in the body (10) and has an end inserted into the central hole in the resilient holder (16). A second inflating channel (152) is defined in the adapter (15) and communicates with the central hole in the resilient holder (16).

The airflow controlling device is mounted in the body (10) to selectively communicate the inlet channel (112) in the connector (11) with one of the inflating channels (126, 152) in the inflating needle (124) and the adapter (15). In a first embodiment, with reference to FIGS. 1 to 3, the airflow controlling device comprises a piston (20), a pushing arm (17), first and second O-rings (22,222) and a spring (24). The piston (20) is moveably mounted in the central hole in the body (10). The piston (20) has a first end abutting against the adapter (15) and a second end. The diameter of the piston (20) is smaller than the inner diameter of the central hole in the body (10), such that an air channel (102) is defined between the piston (20) and the body (10). A central hole (202) is defined in the first end of the piston (20) and extends near the second end of the piston (20). The central hole (202) in the piston (20) communicates with the second inflating channel (152) in the adapter (15). A through hole (204) is defined in the piston (20) near the second end of the piston (20) and communicates with the central hole (202) in the piston (20).

The pushing arm (17) is pivotally attached via a pivot (18) to the second end of the body (10). An eccentric portion (172) is formed on the pushing arm (17) and abuts against the second end of the piston (20). When the pushing arm (17) is pivotally rotated relative to the body (10), the piston (20) will be pushed to move relative to the body (10) by movement of the eccentric portion (172) of the pushing arm (17). Before the piston (20) is pushed to move relative to the body (10), the air channel (102) communicates with the inlet channel (112) in the connector (11).

The first and the second O-rings (22,222) are mounted around the piston (20) and are respectively located at two sides of the through hole (204) to keep the through hole (204) isolated from the air channel (102) between the piston (20) and the body (10). Accordingly, before the piston (20) is pushed to move relative to the body (10), the through hole (204) in the body (10) is isolated from the inlet channel (112) in the connector (11). In addition, a third O-ring (23) mounted around the first end of the piston (20) to keep the air channel (102) from communicating with the second inflating channel (152) in the adapter (15).

The spring (24) is mounted between the piston (20) and the adapter (15) to provide a recoil force to the piston (20). Two ends of the spring (24) respectively abut against the bottom of the central hole (202) in the piston (20) and the adapter (15).

When the user wants to inflate a ball or an object with an inflating hole into which an inflating needle can be inserted, the needle holder (12) is rotated relative to the body (10) to a position where the outlet (122) aligns with the exhausting hole (104). The connector (11) is connected to a pneumatic supply, such that air at a desired high pressure will flow into the inlet channel (112) in the connector (11). Through the air channel (102) between the piston (20) and the body (10), the air will be exhausted from body (10) through the exhausting hole (104). Then, the air will be led into the ball through the outlet (122) in the needle holder (12) and the first inflating channel (126) in the inflating needle (124) to inflate the ball.

Figure 4:
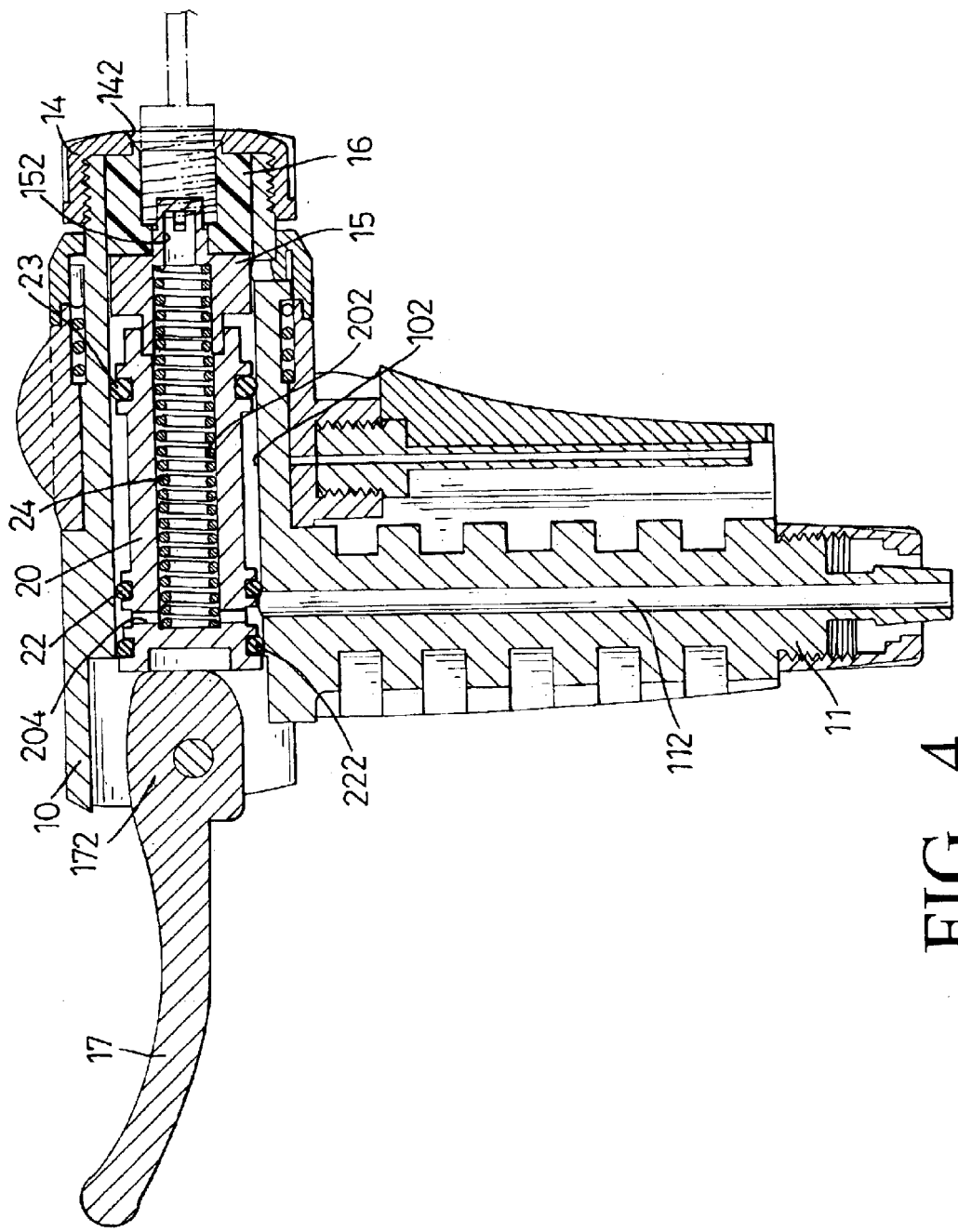
FIG. 4 is an operational cross sectional side plan view of the inflating device in FIG. 1 showing that the piston in the body is pushed to a position where the inlet channel communicates with the second inflating channel in the adapter through the airflow controlling device.

When the user wants to inflate a tire or an object with a tire valve, the tire valve on the tire is firstly inserted into (lie central hole in the resilient holder (16) through the inserting hole (142) in the end cap (14). With reference to FIGS. 1, 2 and 4, the pushing arm (17) is then rotated relative to body (10) to push the piston (20) to move relative to the body (10). With the push of the pushing arm (17), the piston (20) will move to a position where the through hole (204) in the piston (20) communicates with the inlet channel (112) in the connector (11). In the meantime, the air channel (102) will be isolated from the inlet channel (112). Because one end of the resilient holder (16) is abutting against the end cap (14), the piston (20) will push the adapter (15) to deform the resilient holder (16) between the end cap (14). Consequently, the tire valve will be securely squeezed in the holder (16) and communicates with the second inflating channel (152) in the adapter (15). Accordingly, the air flowing into the inlet channel (112) will flow into the through hole (204) in the piston (20). The air will be fed into the tire valve through the central hole (202) in the piston (20) and the second inflating channel (152) in the adapter (15), and the tire is inflated.

With such an inflating device, the air can be fed into objects with different receiving means, and the use of the inflating device is versatile.

Figure 5:
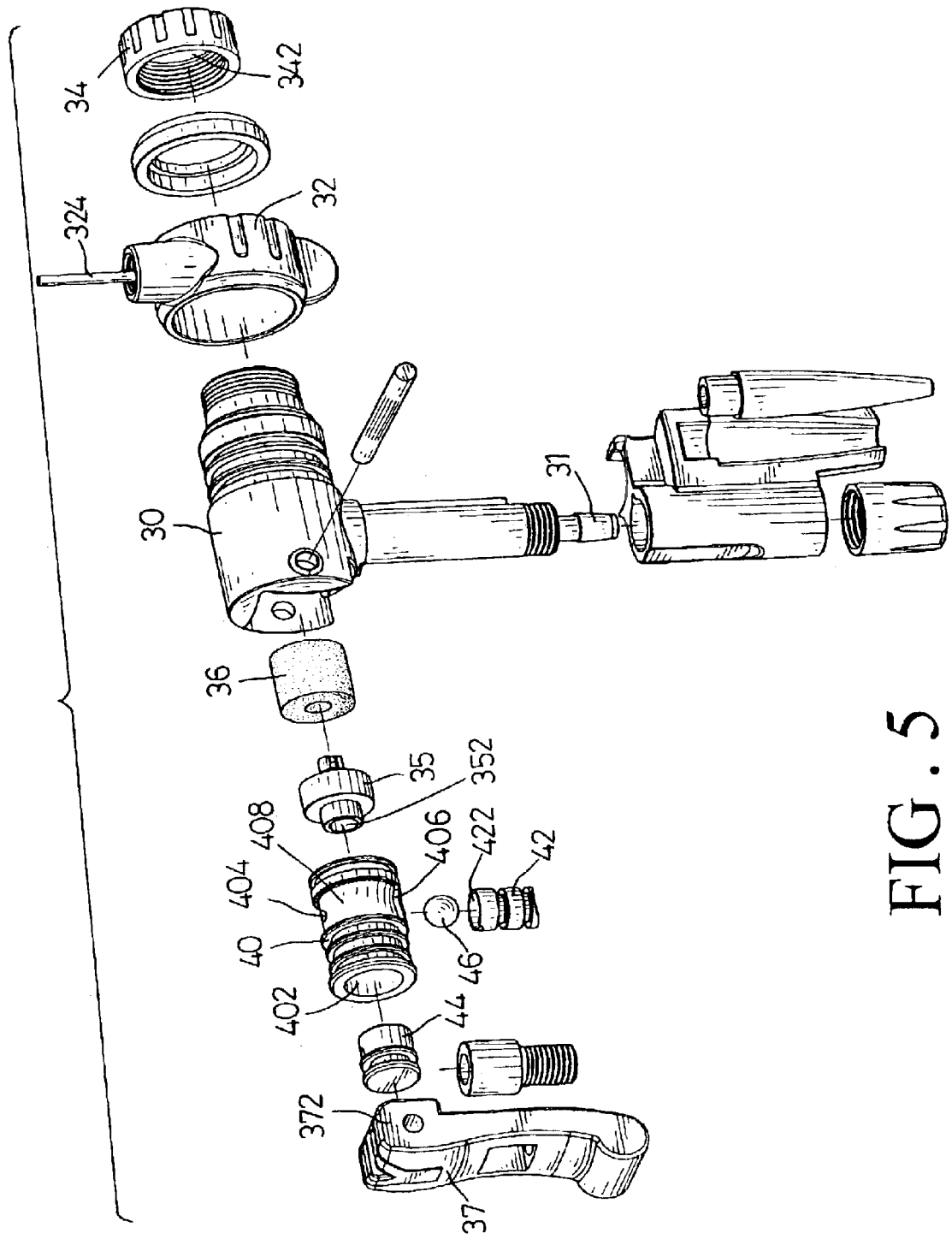
FIG. 5 is an exploded perspective view of a second embodiment of an inflating device in accordance with the present invention.
Figure 6:
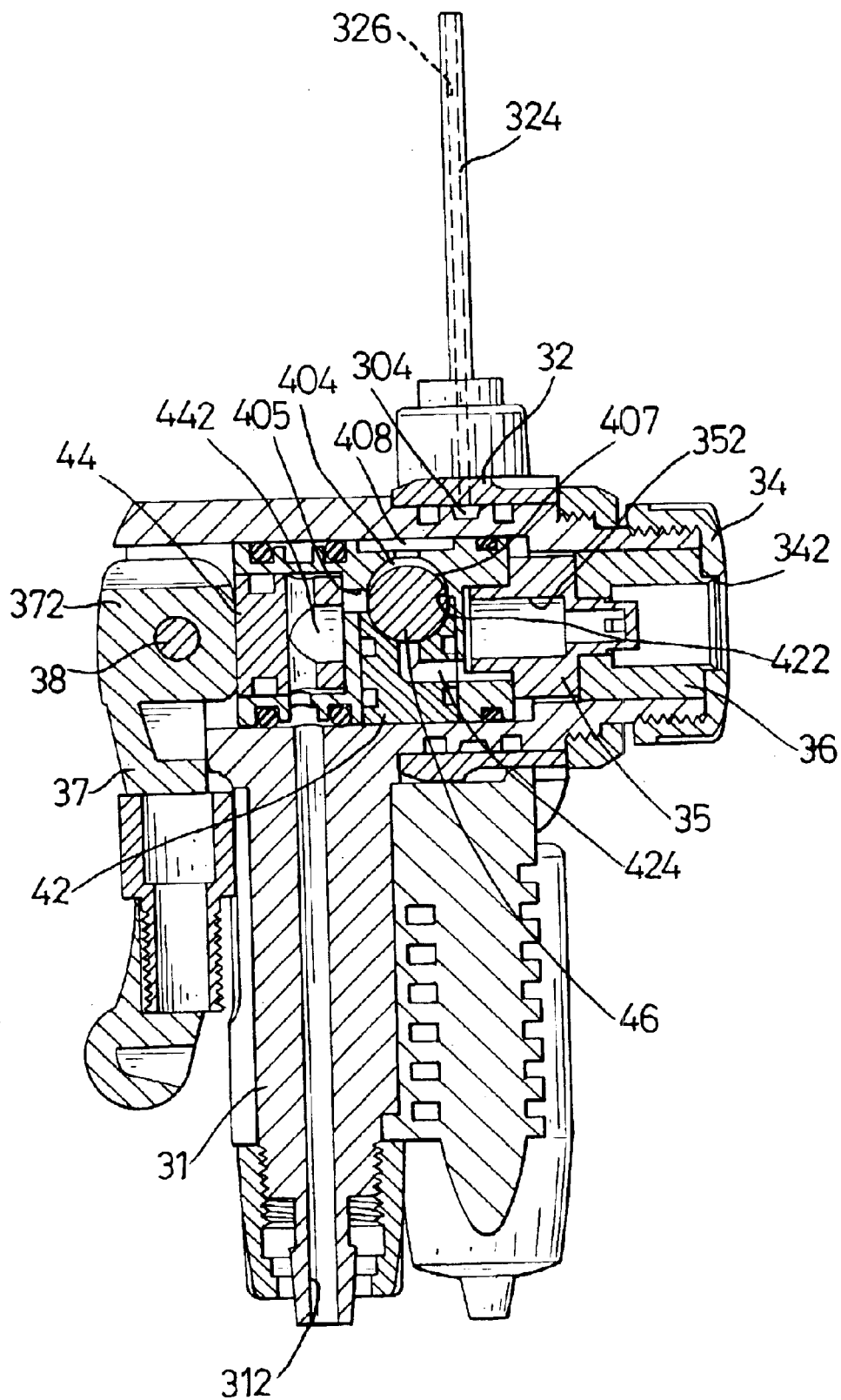
FIG. 6 is a cross sectional side plan view of the inflating device in FIG. 5.
Figure 7:
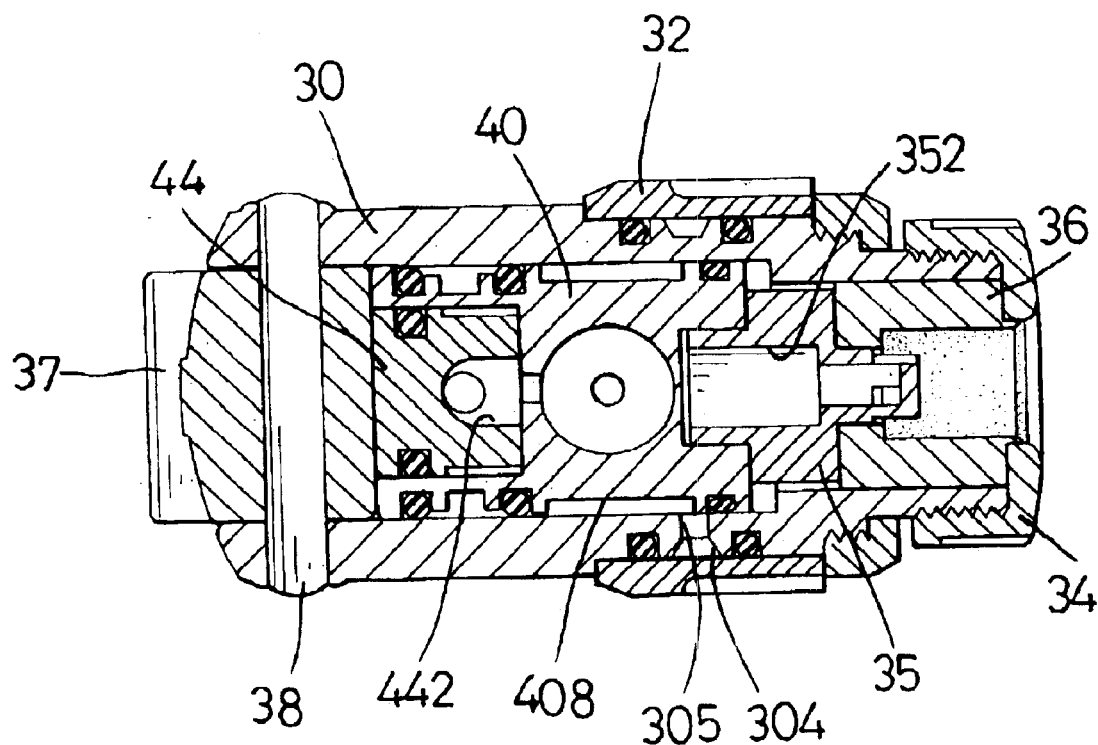
FIG. 7 is a side plan view in partial cross section of the inflating device in FIG. 5.

With reference to FIGS. 5 to 7, a second embodiment of the airflow controlling device comprises a piston (40), a pushing arm (37), an end plug (44), a bottom plug (42) and a ball (46). The piston (40) is moveably mounted in the central hole in the body (30) and has a first end abutting against the adapter (35), a second end and a middle portion. A central hole (402) is defined in the second end of the piston (40) and extends near the middle portion of the piston (40). A through hole (not numbered) is defined in the piston (40) near the second end and simultaneously communicates with the central hole (402) and the inlet channel (312) in the connector (31). An upper cavity (407) is defined in the piston (40) near the middle portion of the piston (40). A bottom hole (406) is defined in the piston (40) and communicates with the upper cavity (407). An air channel (408) is defined around the piston (40) and is isolated from the through hole in the piston (40). The air channel (408) communicates with the exhausting hole (305) in the body (30). A top hole (404) is defined in the piston (40) and simultaneously communicates with the upper cavity (407) and the air channel (408) in the piston (40).

The pushing arm (37) is pivotally attached to the second end of the body (30) and has an eccentric portion (372) abutting against the second end of the piston (40).

The end plug (44) is securely received in the central hole (402) in the piston (40) and has a connecting channel (442) communicating with the through hole in the piston (40).

The bottom plug (42) is securely received in the bottom hole (406) and has a lower cavity (422) defined in the top of the bottom plug (42). The lower cavity (422) faces the upper cavity (407) in the piston (40) to define a chamber between the piston (40) and the bottom plug (42) by the upper cavity (407) in cooperation with the lower cavity (422). A lower channel (424) is defined in the bottom plug (42) and communicates with the lower cavity (422) and the second inflating channel (352) in the adapter (35).

A connecting hole (405) is defined in the piston (40) and simultaneously communicates with the connecting channel (442) in the end plug (44) and the chamber between the piston (40) and the bottom plug (42).

The ball (46) is moveably received in the chamber between the piston (40) and the bottom plug (42). The diameter of the ball (46) is smaller than the inner diameter of the chamber.

In addition, an exhausting channel (304) is defined around the body (30) and simultaneously communicates with the exhausting hole (305) in the body (30) and the outlet (not numbered) in the needle holder (32). With the arrangement of the exhausting channel, the outlet in the needle holder

(32) will always communicate with the exhausting hole (305) no matter that the needle holder (32) is rotated to at any position relative to the body (30).

When the user wants to inflate a ball, the needle holder (32) on which the inflating needle (324) is mounted is rotated to a desired position relative to the body (30) and the inflating needle (324) is inserted into an inflating hole in the ball. The air in the ball will flow into the chamber between the piston (40) and the bottom plug (42) through the first inflating channel (326) in the inflating needle (324), the outlet in the needle holder (32), the exhausting channel (304) and the exhausting hole (305) in the body (30), the air channel (408) around the piston (40) and the top hole (404). The ball (46) in the chamber will be pushed to move downward by the pressure from the ball. Consequently, the ball (46) will close the communication between the chamber and the lower channel (424) in the bottom plug (42). Therefore, the air supplied from a pneumatic supply will be led to the ball through the inlet channel (312) in the connector (31), the through hole in the piston (40), the connecting channel (442) in the end plug (44), the connecting hole (405), the chamber, the top hole (404), the air channel (408), the exhausting hole (305), the exhausting channel (304), the outlet in the needle holder (32) and the first inflating channel (326) in the inflating needle (324), and thus the ball is inflated.

Figure 8:
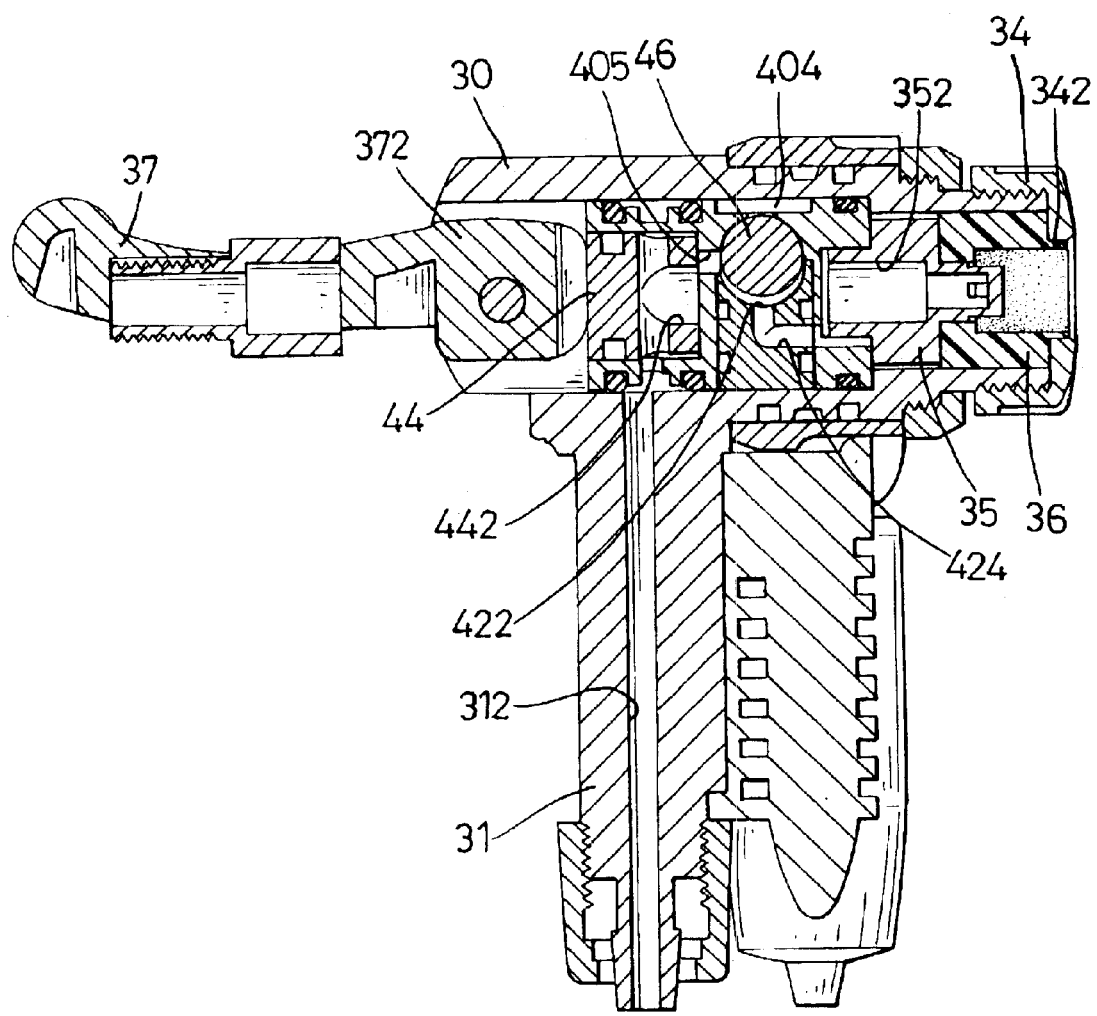
FIG. 8 is an operational cross sectional side plan view of the inflating device in FIG. 5 showing that the piston in the body is pushed to a position where the inlet channel communicates with the second inflating channel in the adapter through the airflow controlling device.

When the user wants to inflate a tire, the tire valve on the tire is inserted into the central hole in the resilient holder (36) through the inserting hole (342) in the end cap (34). With further reference to FIG. 8, the air in the tire will flow into the chamber through the second inflating channel (352) in the adapter (35) and the bottom channel (424) in the bottom plug (42). The ball (46) in the chamber will be pushed to move upward by the pressure from the tire, and the communication between the chamber and the top hole (404) is closed. Accordingly, the air supplied from the pneumatic supply will be fed into the tire through the inlet channel (312), the through hole in the piston (40), the connecting channel (442), the connecting hole (405), the chamber, the. bottom channel (424) in the bottom plug (42) and the second inflating channel (352) in the adapter (35), and thus the tire is inflated. Therefore, the inflating device in accordance with the present invention can be used to inflate different types of objects, and the inflating device is versatile in use.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An inflating device comprising:
   a tubular body having a first end, a second end and a central hole with an inner diameter defined through the tubular body;
   a connector formed on the body and adapted to connect to a pneumatic supply, and the connector having an inlet channel extending through the connector and communicating with the central hole in the body;
   an inflating needle mounted on the body and having a first inflating channel defined through the inflating needle and communicating with the central hole in the body;
   an end cap attached to the first end of the body and having an inserting hole defined through the end cap;
   an annular resilient holder received in the first end of the body and abutting against the end cap, and the resilient holder having a central hole;
   an adapter received in the central hole in the body and having an end inserted into the central hole in the resilient holder and a second inflating channel communicating with the central hole in the resilient holder; and
   an airflow controlling device mounted in the body to selectively communicate the inlet channel in the connector with one of the first inflating channel in the inflating needle and the second inflating channel in the adapter.

2. The inflating device as claimed in claim 1 further comprising a needle holder rotatably mounted around the body for the inflating needle being attached to the needle holder.

3. The inflating device as claimed in claim 2, wherein the needle holder has an outlet communicating with the first inflating channel in the inflating needle; and
   the body has an exhausting hole communicating with the outlet in the needle holder.

4. The inflating device as claimed in claim 3, wherein the airflow controlling device comprises:
   a piston moveably mounted in the central hole in the body and having a first end abutting against the adapter and a second end, and the piston has a diameter smaller than the inner diameter of the central hole in the body to define an air channel between the piston and the body, and the piston further comprising
   a central hole with a bottom defined in the first end of the piston, extending near the second end of the piston and communicating with the second inflating channel in the adapter; and
   a through hole defined in the piston near the second end of the piston and communicating with the central hole in the piston;
   a pushing arm pivotally attached to the second end of the body and having an eccentric portion abutting against the second end of the piston to push the piston to move relative to the body when the pushing arm is pivoted relative to the body;
   a first O-ring and a second O-ring each mounted around the piston and respectively located at two sides of the through hole to keep the through hole being isolated from the air channel between the piston and the body; and
   a spring mounted between the piston and the adapter to provide a recoil force to the piston,
   wherein the air channel communicates with the inlet channel in the connector before the piston is pushed to move relative to the body; and
   the through hole in the body communicated with the inlet channel in the connector after the piston is pushed to move relative to the body.

5. The inflating device as claimed in claim 4, wherein the spring has two ends respectively abutting with the bottom of the central hole in the piston and the adapter.

6. The inflating device as claimed in claim 4 further comprising a third O-ring mounted around the first end of the piston.

7. The inflating device as claimed in claim 2 further comprising a holding cap mounted around the body; and
   a torsion spring mounted around the body between the needle holder and the holding cap and having two ends securely attached to the needle holder and the holding cap respectively.

8. The inflating device as claimed in claim 3, wherein the airflow controlling device comprises:
- a piston moveably mounted in the central hole in the body and having a first end abutting against the adapter, a second end and a middle portion, the piston further comprising
  - a central hole defined in the second end of the piston and extending near the middle portion of the piston;
  - a through hole defined in the piston near the second end and simultaneously communicating with the central hole and the inlet channel in the connector;
  - an upper cavity defined in the piston near the middle portion of the piston;
  - a bottom hole defined in the piston and communicating with the upper cavity;
  - an air channel defined around the piston, isolated from the through hole in the piston and communicating with the exhausting hole in the body; and
  - a top hole defined in the piston and simultaneously communicating with the upper cavity and the air channel in the piston;
- a pushing arm pivotally attached to the second end of the body and having an eccentric portion abutting against the second end of the piston to push the piston to move relative to the body when the pushing arm is pivoted relative to the body;
- an end plug received in the central hole in the piston and having a connecting channel communicating with the through hole in the piston;
- a bottom plug with a top received in the bottom hole and having a lower cavity defined in the top of the bottom plug and facing the upper cavity in the piston to define a chamber with an inner diameter between the piston and the bottom plug by the upper cavity in cooperation with the lower cavity, and the bottom plug further comprising a lower channel communicating with the lower cavity and the second inflating channel in the adapter; and
- a ball moveably received in the chamber between the piston and the bottom plug and having a diameter smaller than the inner diameter of the chamber,
- wherein the piston further comprises a connecting hole defined in the piston and simultaneously communicating with the connecting channel in the end plug and the chamber between the piston and the bottom plug.

9. The inflating device as claimed in claim 8, wherein the body has an exhausting channel defined around the body and simultaneously communicating with the exhausting hole in the body and the outlet in the needle holder.

* * * * *